United States Patent
Clark et al.

(10) Patent No.: US 9,923,924 B2
(45) Date of Patent: Mar. 20, 2018

(54) ENDPOINT POLICY CHANGE

(71) Applicant: Hewlett-Packard Development Company, L.P., Houston, TX (US)

(72) Inventors: Charles F. Clark, Roseville, CA (US); Duane E. Mentze, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 181 days.

(21) Appl. No.: 14/613,843

(22) Filed: Feb. 4, 2015

(65) Prior Publication Data

US 2016/0226912 A1    Aug. 4, 2016

(51) Int. Cl.
*H04L 29/06* (2006.01)
*H04W 4/02* (2018.01)

(52) U.S. Cl.
CPC .............. *H04L 63/20* (2013.01); *H04W 4/02* (2013.01)

(58) Field of Classification Search
CPC ..... H04L 63/20; H04L 63/08; H04L 63/0869; H04L 63/0876; H04L 63/0457; G06F 21/44; G06F 21/445; G06F 12/0811; G06F 12/0824; G06F 2212/283
USPC .................................. 726/1–6; 713/168–170
See application file for complete search history.

(56) References Cited

U.S. PATENT DOCUMENTS

| | | | |
|---|---|---|---|
| 6,891,837 B1 | 5/2005 | Hipp et al. | |
| 7,805,606 B2* | 9/2010 | Birger | H04L 29/12207 713/168 |
| 7,886,335 B1* | 2/2011 | Chickering | H04L 43/0817 726/1 |
| 8,375,136 B2 | 2/2013 | Roman et al. | |
| 8,412,829 B2* | 4/2013 | Keller | H04L 29/06 709/223 |
| 8,565,726 B2* | 10/2013 | Walker | H04L 41/0806 455/411 |
| 8,688,972 B2* | 4/2014 | Patrick | H04L 29/0602 713/153 |
| 8,763,076 B1 | 6/2014 | Satish et al. | |
| 8,763,089 B2* | 6/2014 | Qureshi | H04L 63/0823 709/206 |
| 2013/0086184 A1 | 4/2013 | Kavantzas et al. | |

OTHER PUBLICATIONS

Juniper Networks, Inc., "Unified Access Control", Product Category Brochure, Sep. 2010, 12 pages.
Configuring Dynamic Access Pollicies, Chapter 66, Retrieved Jan. 29, 2015.

* cited by examiner

*Primary Examiner* — Hosuk Song
(74) *Attorney, Agent, or Firm* — Brooks, Cameron & Huebsch, PLLC (57) ABSTRACT

Endpoint device policy change can, in various examples, include detecting a change in a first registered attribute associated with an endpoint device on a network to a second registered attribute and changing a first policy applied to the endpoint device to a second policy associated with the second registered attribute in response to the detected change.

17 Claims, 4 Drawing Sheets

ENDPOINT POLICY CHANGE

BACKGROUND

Networks can include a plurality of resources connected by communication links, and can be used to connect people, provide services (e.g., internally and/or externally via the Internet and/or intranet), and/or organize information, among other activities associated with an entity. An example network can include a software-defined network (SDN).

DETAILED DESCRIPTION

Networks can include a plurality of resources such as databases and/or endpoint devices connected by communication links, and can be used to connect people, provide services (e.g., internally and/or externally via the Internet and/or intranet), and/or organize information, among other activities. Examples of endpoint devices include computers, tablets, phones, printers, cameras, door locks, HVAC controller, among other endpoint devices capable of operating on a network. An example network can include a software-defined network (SDN).

Endpoint devices may be authenticated with a network such as an SDN when connecting (e.g., initially connecting) to the network to enable operation of the endpoint devices on the network. For instance, authentication can include authentication of a particular endpoint device and/or user, ensuring capability of the endpoint device on the network, and/or applying a policy to the endpoint device. Some approaches authenticate a device on a network based on an intended user and/or user group of the endpoint device (e.g., name, title, security clearance, and/or a location, among other information of an intended user) and/or based on device information (e.g., serial number and/or a location on a network, among other device specific information, etc.).

Authentication includes applying a policy to an endpoint device. A policy governs various aspects of operation of an endpoint device (e.g., governs communications to and/or from the endpoint device) and/or governs specific actions to be taken in response to the operation of the endpoint device. For example, a policy may be applied to and/or otherwise include a particular endpoint device and/or group of endpoint devices to govern an ability of the endpoint point device(s) to send and/or receive communications and/or include an action (e.g., a governing action) to be executed in response to a communication to and/or from the endpoint device(s), among other information. A policy may be applied to an endpoint device during authorization or otherwise that may be utilized by the endpoint device during its operational lifetime on the network. However, such a policy may not account for and/or may not be updatable or otherwise revised to address a change associated with the endpoint device (e.g., the endpoint device becoming corrupted) during operation of the endpoint device on the network.

Examples herein are directed to identifying a change in an attribute of endpoint devices on a network such as a SDN. That is, such a change can be identified during operation of the endpoint device on the network (e.g., at a time subsequent to initial authorization of the endpoint device on the network). Identifying a change during operation of the endpoint device can facilitate association of a registered attribute to an endpoint device during operation of the endpoint device on the network, as detailed herein.

In various examples, a full Boolean expression may be utilized to promote endpoint policy change, as described herein. For example, a policy (e.g., a first policy and/or a second policy) may be defined by and/or represented by a full Boolean expression to promote identifying changes (e.g., changes in attributes) and/or applying various policies to endpoint devices. Full Boolean expressions refers to Boolean expressions that can include but are not limited to simple Boolean operators such as "and" and/or "or". That is, full Boolean expressions can include full Boolean operators. Examples of full Boolean operators suitable in full Boolean expressions include "if", "(',')", and/or "not" operators, among others. Use of full Boolean operators, for instance, to represent a policy, a first registered attribute, and/or a second registered attribute, and promote endpoint device policy change, as described herein. Full Boolean expressions can be used represent each policy maintained in a database, such as those described herein. That is, each policy can be represented by a respective full Boolean expression.

Figure 1:
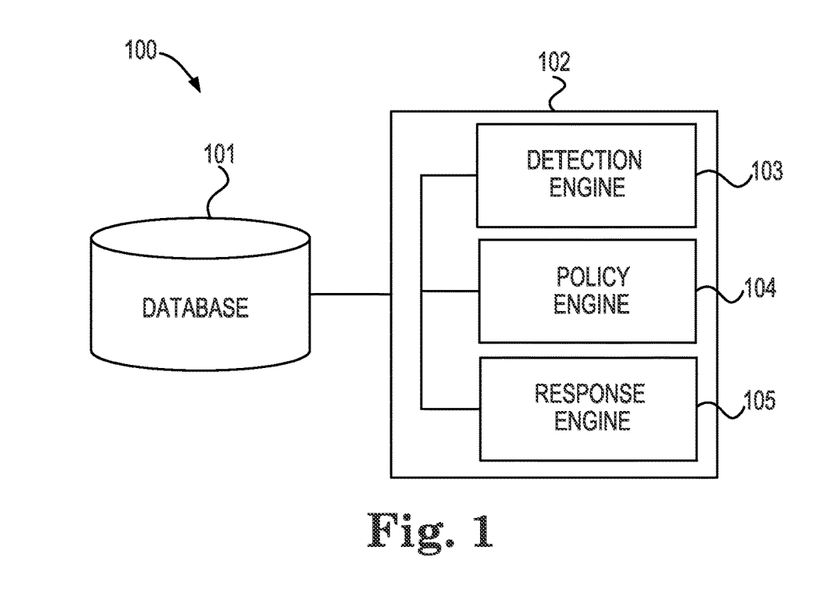
FIG. 1 illustrates a diagram of an example of a system according to the disclosure.
Figure 2:
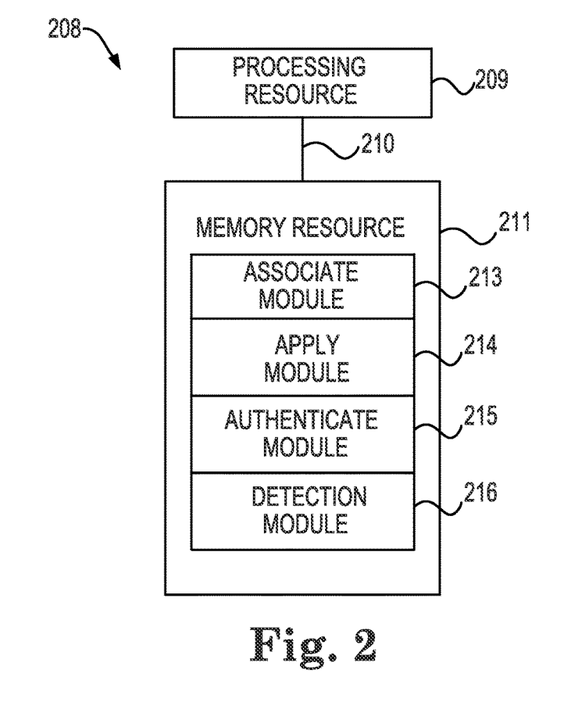
FIG. 2 illustrates a diagram of an example computing device according to the disclosure.

FIGS. 1 and 2 illustrate examples of systems 100, 208 according to the present disclosure. That is, FIG. 1 illustrates a diagram of an example of a system 100 according to the disclosure. The system 100 can include a database 101, a subsystem 102, and/or a number of engines 103, 104, 105. The subsystem can include the number of engines in communication with the database 101 via a communication link. The system 100 can include additional or fewer engines than illustrated to perform the various functions described herein. The system can represent instructions and/or hardware of a network controller (e.g., system 208 as referenced in FIG. 2, etc.).

The number of engines 103, 104, 105 can include a combination of hardware and programming to perform functions including those described herein (e.g., detect a change in a first registered attribute to a second registered attribute, etc.). The instructions can include instructions (e.g., software, firmware, etc.) stored in a memory resource (e.g., computer readable medium (CRM), machine readable medium (MRM), etc.) as well as hard-wired program (e.g., logic).

The detection engine 103 can include hardware and/or a combination of hardware and instructions to detect a change in a first registered attribute associated with an endpoint device authenticated on a network to a second registered attribute. A registered attribute refers to terms and/or phrases including numeric characters, alphabetic characters, and/or alpha-numeric characters, among other possible types of characters that can be associated, as described herein, with an endpoint device and/or a group of endpoint devices.

For example, registered attributes can be based on an end user, an endpoint device, and/or an application of an endpoint device, among other possibilities. Put another way, registered attributes can be a user specific, endpoint device specific and/or an application specific extensible group of terms that can describe an identity, a type, a status (e.g. a status determined by an application), a role, a location and/or other aspects of users, endpoint devices, and/or application on (i.e., connected to) a network such as a SDN. Examples of registered attributes include 'employee', 'contractor', 'guest', 'corporate_device', and 'multifactor_authenticated', among others. In some examples, the registered attributes are fully qualified names to prevent name collision or other unintended interaction between attributes with identical names, for example, two identical names registered by different applications.

In some examples, a registered attribute (e.g., a first and/or a second registered attribute) is a status attribute. A status attribute indicates a particular status of an endpoint device during operation on a network. That is, status attributes can be indicative of a particular status at a given time (a current status at a current time and/or a status at a past time) during operation of an endpoint device (e.g., an authenticated or a non-authenticated endpoint device). In contrast to other approaches that rely on policies applied at a time of authentication, detecting changes in status attributes and/or other types of attributes of endpoint devices during operation of the endpoint devices on a network can desirably promote applying a different policy (e.g., a second policy) to an endpoint device based on the detected change while maintaining operation of the endpoint device on the network (e.g., without reauthentication of an authenticated endpoint device). For instance, a status attribute (e.g., infected, quarantined, healthy, etc.) can be monitored by an application (e.g. a security application such as those described herein) associated with the endpoint device.

Registered attributes have associated permissions that restrict (e.g., who, how, and/or under what circumstances) association of registered attributes with an endpoint device and/or a group of endpoint devices and/or whether a particular registered attribute can be included in a particular policy statement. In various examples, an application (e.g., a security application), an administrator (e.g., with a certain job title, access right, etc., satisfying a permission), and/or a computing device (e.g., operating on or in communication with a trusted server satisfying a permission) can associate a particular attribute with a particular endpoint device, among other possibilities. The permissions can include role-based access control (RBAC) type granularity in some examples.

For example, a network administrator or other individual may install and/or update a security application on a network (e.g., an operational network). In such an example, the installed and/or updated security application (having permission to register an attribute) may register an attribute (e.g., addition of a new attribute that can be associated with an endpoint device), for example, attribute "com.hh.security.infected" can be registered with an endpoint database (e.g., database 101, included in database 101, and/or another database in communication with database 101, etc.). The endpoint database can maintain a record of all network attached endpoint devices, a number of attributes associated with the endpoint devices and/or a list of attributes that can be associated with the endpoint devices. The endpoint database can include a plurality of registered attributes (e.g., predetermined registered attributes). The first registered attribute and/or the second registered attribute can, in some examples, be included in the plurality of registered attributes.

In some examples, an application or other service can automatically associate, without a user input, a registered attribute with and/or apply a second policy to an endpoint device. Automatically applying a second policy to an endpoint device can occur in response to detection of a change, for example, by detection engine 103. For instance, a second registered attribute can be automatically associated (e.g., without a user input) with an endpoint device (e.g., an authenticated endpoint device) in response to a detected change in status, among other possibilities. A first registered attribute corresponding to a first a status (e.g., healthy) of an endpoint device can automatically be changed to a second attribute corresponding to a different status (e.g., infected) in response to detection of the status change (e.g., by a security application). Similarly, changes in various other types of information such as a change in location of an endpoint device can be accounted for by automatically changing a first registered attribute (e.g., corresponding to a first location) to a second registered attribute associated with an endpoint device. Such changes in registered attributes and can be reflected in a database tracking registered attributes associated an endpoint device and/or a group of end point devices.

Detection engine 103 can detect a change in a registered attribute (e.g., from a first registered attribute to a second registered attribute) based on monitored operations of the endpoint device (e.g., authenticated endpoint device) on the network. For example, detection engine 103 and/or a security application can detect a suspicious connection request within a network using an SDN rule. As used herein, an SDN rule can refer to a rule (e.g., an Open Flow rule) specified by a user and/or administrator of the client-server network and executed by an SDN controller and/or an application in communication with an SDN controller. In some examples, a first registered attribute can be changed to a second registered attribute in response to a suspicious connection request, as described herein, within a network on which an endpoint device is authenticated and/or operating on. An SDN controller can in some examples, automatically associate a registered attribute (e.g., a second registered attribute) with an endpoint device, for instance, in response to detection of a suspicious connection request or other monitored communication.

An SDN can refer to a form of network virtualization in which a control plane (system that makes decisions that affect network traffic) is separated from the data plane (system that moves the network traffic) and implemented as instructions (e.g., software). The control plane defines how network traffic is handled (e.g., via protocols such as spanning tree, open shortest path first, border gateway protocol, etc.) in a network device (e.g., an endpoint device). The data plane handles the network traffic according to the control plane (e.g., using forwarding tables, routing tables, queues, etc.) in a network device. The control plane may be said to be distributed in a network where each network device includes a control plane and a data plane. Thus, in the event of network congestion, each network device may take corrective action largely independently of other network devices. However, in an SDN, network administrators can have programmable (e.g., centralized) control of network traffic without relying on physical access to the network's hardware devices.

Open Flow, as used herein, can refer to a communication protocol that gives access to a data plane of a network (e.g., an SDN). Open Flow can enable remote controllers (e.g., SDN controllers) to determine the path of network packets through a network of switches.

A change can include an addition of a different registered attribute associated with an endpoint device, a removal of a registered attribute associated with an endpoint device, and/or a modification of a registered attribute associated with the endpoint device to a different registered attribute.

Notably, the change occurs during operation of the endpoint device on the network. That is, the change occurs in an endpoint device during operation of the endpoint device on the network (e.g., an SDN).

In response to detecting a change of a registered attribute of an endpoint device (e.g., a change from a first registered attribute to a second registered attribute) a policy applied to the endpoint device can be changed. For example, policy engine 104 can include hardware and/or a combination of hardware and instructions to change a first policy applied to the endpoint device to a second policy associated with the second registered attribute in response to the detected change.

Response engine 105 can include hardware and/or a combination of hardware and instructions to execute an action governed by the second policy in response to a communication of the endpoint device. Communications include communications to and/or from an endpoint device (e.g., an authenticated endpoint device or an unauthenticated endpoint device). Examples of actions governed by a policy (e.g., the second policy) that the response engine can execute include redirect a communication (e.g., redirect a suspicious connection request based on a characteristic of the suspicious connection request) to a quarantine device or endpoint device other than a requested endpoint of the communication, execute an intrusion detection system, and/or redirect a communication (e.g., malicious DNS request) to a correct internet protocol (IP) address, initiating an audit trail of a user and/or and endpoint device, among other actions.

The particular actions executed that are governed by a policy can be differentiated and selective responses (e.g., to a detected attribute change) that may be configured by an administrator and/or user of the client-server network. For example, the administrator can specify a policy that instruct how connection requests of a particular type, connection requests from a particular originator (e.g., a particular client originating and/or generating the connection request), and/or connection requests to access a particular server outside of the client-server network should be handled.

For example, a policy can cause a log entry to be created, among other possible actions, when any non-guest is found using an infected system (e.g., as determined by a security application) using the expression 'infected AND NOT guest'.

In some examples, an administrator of the client-server network can add a number of protocols and a number of request types to the client-server network using an SDN controller, particularly, using a network service security application embedded in an SDN controller (as discussed further herein).

In some examples, the response engine 105 can instruct a security application in the client-server network to execute a number of actions. For example, as discussed further in relation to FIGS. 3 and 4, a suspicious connection request, as determined by a policy such as the second policy, can be redirected to a trusted server in the client-server network, the trusted server can process packets associated with the suspicious connection request, and the trusted server can send a response back to a security application within the client-server network. In response to receiving the response from the trusted server, the security application can identify the original request associated with the suspicious connection request, and execute a number of actions to handle the suspicious connection request. The original request can be identified by looking up the source IP address of the client and intended destination IP address in a database (e.g., a database maintained by the security application). For example, the security application can generate and/or display a number of statistics related to the suspicious connection request and/or drop the packet associated with the suspicious connection request, among other actions. Such statistics can be used by administrators of the client-server network to improve security policies and/or prevent future security attacks.

In some examples, an apply engine (not shown) can include hardware and/or a combination of hardware and instructions to associate a first registered attribute with an endpoint device. For instance, the apply engine can apply the first policy with the endpoint device during authorization (i.e., during but not after authorization) of the endpoint device on the network and/or when an unauthenticated device initially communicates on or attempts to communicate on a network, among other possibilities. The apply engine can apply a second policy (a different policy than the first policy) to the endpoint device during operation of the endpoint device on the network (e.g., subsequent to the authorization of the endpoint device on the network). Desirably, the apply engine therefore associates the second policy with the authenticated endpoint device during operation of the endpoint device on the network (e.g., while maintaining the authorization of the device on the network). That is, with either an authenticated device or an unauthenticated device, the continued operation of the endpoint device on the network can occur, at least in part, in accordance with the second policy applied to the endpoint device.

FIG. 2 illustrates a diagram of an example computing device 208 according to the present disclosure. The computing device 208 can utilize instructions (e.g., software and/or firmware) hardware, and/or logic to perform a number of functions including those described herein. The computing device 208 can be a combination of hardware and program instructions configured to share information. The hardware, for example, can include a processing resource 209 and/or a memory resource 211 (e.g., CRM, MRM, database, etc.).

A processing resource 209, as used herein, can include a processor capable of executing instructions stored by a memory resource 211. Processing resource 209 may be implemented in a single device or distributed across multiple devices. The program instructions (e.g., computer readable instructions (CRI)) can include instructions stored on the memory resource 211 and executable by the processing resource 209 to implement a desired function (e.g., associate a second policy with an authenticated endpoint device).

The memory resource 211 can be in communication with a processing resource 209. A memory resource 211, as used herein, can include memory components capable of storing instructions that can be executed by processing resource 209. Such memory resource 211 can be a non-transitory CRM or MRM. Memory resource 211 may be integrated in a single device or distributed across multiple devices. Further, memory resource 211 may be fully or partially integrated in the same device as processing resource 209 or it may be separate but accessible to that device and processing resource 209. Thus, it is noted that the computing device 208 may be implemented on a participant device, on a server device, on a collection of server devices, and/or a combination of the user device and the server device.

The memory resource 211 can be in communication with the processing resource 209 via a communication link (e.g., a path) 210. The communication link 210 can be local or remote to a machine (e.g., a computing device) associated with the processing resource 209. Examples of a local communication link 210 can include an electronic bus internal to a machine (e.g., a computing device) where the memory resource 211 is one of volatile, non-volatile, fixed, and/or removable storage medium in communication with the processing resource 209 via the electronic bus.

A module and/or modules 213, 214, 215, 216 can include CRI that when executed by the processing resource 209 can perform a number of functions including those described herein. The number of modules 213, 214, 215, 216 can be sub-modules of other modules. For example, the associate module 213 and authenticate 215 module can be sub-modules and/or contained within the same computing device. In another example, the number of modules 213, 214, 215, 216 can comprise individual modules at separate and distinct locations (e.g., CRM, etc.).

Each of the number of modules 213, 214, 215, 216 can include instructions that when executed by the processing resource 209 can function as a corresponding engine as described herein. For example, the associate module 213 can include instructions that when executed by the processing resource 209 can function as the detection engine 103. In another example, the apply module 214 can include instructions that when executed by the processing resource 209 can function as the apply engine (not shown).

The associate module 213 can include instructions that when executed by the processing resource associate a first registered attribute with an endpoint device. In various examples, the apply module 214 can include instructions that when executed by the processing resource can apply a first policy associated with the first registered attribute to the endpoint device (e.g., during authorization of the endpoint device on a network) and apply a second policy to the endpoint device based on the second registered attribute in response to the detected change such as detected by the associate module 213. The authenticate module 215 can authenticate the endpoint device on a SDN. The detection module 216 can include instructions that when executed by the processing resource detect a change in a first registered attribute to a second registered attribute during operation of the authenticated endpoint device on the SDN. In some examples, the apply module 214 can include instructions that when executed by the processing resource to continue operation (without reauthentication) of the authenticated endpoint device on the SDN in response to applying the second policy to the authenticated endpoint device.

Figure 3:
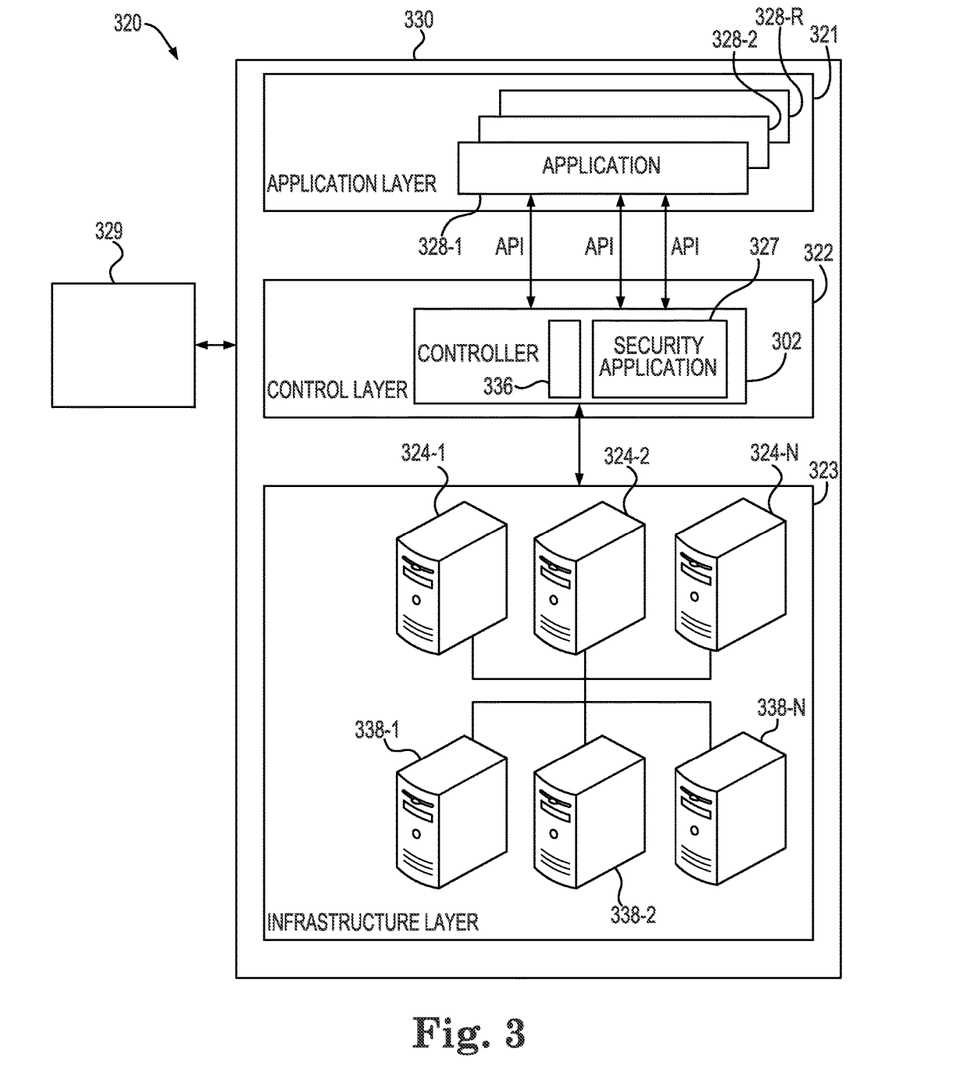
FIG. 3 illustrates an environment according to the disclosure.

FIG. 3 illustrates an environment 320 according to the present disclosure. The environment 320 can include a client-server network (e.g., a cloud network) 330 that allows endpoint devices 338-1, 338-2, 338-D (e.g., thin clients, portable computers, smartphones, desktop computers, etc.) to access a pool of hosted computing and/or storage resources (e.g., the cloud resources) and virtual network services over a physical network (e.g., a private intranet and/or the public Internet). While illustrated as included in the client-server network 330 it is understood that the endpoint devices 338-1, 338-2, 338-D are on the network 330 and coupled thereto although endpoint devices 338-1, 338-2, 338-D regardless of a physical location of the endpoint devices. Examples, the client-server network 330 can include an SDN-enabled network (e.g., a network that can be managed as an SDN). That is, the environment 320 can include an SDN enabled client-server network (e.g., an SDN). An SDN can include a form of cloud virtualization in which a control layer 322 (e.g., a subsystem that makes decisions that affect cloud traffic) is separated from an infrastructure layer 323 and is implemented as instructions. The control layer 322 can define how cloud traffic is handled (e.g., via protocols) in a number of devices.

As illustrated in FIG. 3, the environment 320 can include an application layer 321, a control layer 322, and/or an infrastructure layer 323 in the network 330 (e.g., in the SDN). The application layer 321 can include a number of applications (e.g., programs) 328-1, 328-2, . . . , 328-R that communicate cloud operating specifications and/or desired cloud behavior to the control layer 322. Although security application 327 is depicted in FIG. 3 as embedded in controller 302, security application 327 is also an example application in the application layer 321. Applications in the application layer 321 can be implemented by the controller 302 and/or be implemented by other computing devices that interface with controller 302. The application layer 321 can communicate with the control layer 322 via an application instructions interface (API). An API can include a set of routines, protocols, and/or tools that accomplish a specific task and/or are allowed to interact with a specific software component.

In some examples, the application layer 321 can communicate with the control layer 322 via a representation state transfer (REST) API. REST can include an architectural style that abstracts architectural elements within a distributed hypermedia system that ignores the details of component implementation and protocol syntax in order to focus on the roles of components, the constraints upon interaction with other components, and interpretation of significant data elements. A REST API can include a web API implemented using hypertext transfer protocol (HTTP) and REST principles as a collection of resources. However, examples are not so limited, and the application layer 321 can communicate with the control layer 322 using other APIs and/or protocols.

The control layer 322 can translate operating specifications provided by the application layer 321 to the infrastructure layer 323. Further, the control layer 322 can include a controller (e.g., an SDN controller) 302 to communicate between the application layer 321 and the infrastructure layer 323. The SDN controller 302 can be hardware and/or instructions. A hardware SDN controller 302 can include a processing resource in communication with a memory resource. The memory resource can include instructions, executable by the processing resource to perform a number of functions described herein. In some examples, the SDN controller 302 can be a discrete device, such as a server.

Also, as illustrated in FIG. 3, the environment 320 can include a network service security application (e.g., a security application) 327 and/or other application 336 embedded in the controller 302, (or implemented by one or more other computing devices interfacing with controller 302), and a number of servers 324-1, 324-2, . . . , 324-N (referred to herein as servers 324). The infrastructure layer may include various network devices, such as switches, routers, bridges, wireless access points, and the like, for connecting the servers 324 together in a network. The network service security application 327 can include hardware and/or instructions to maintain a table of outstanding suspicious connection requests (e.g., suspicious connection requests that have not yet been processed by a trusted server and/or have not yet been resolved by the network service security application). In some examples, the network service security application 327 can maintain a number of controlled (e.g., user and/or administrator configurable) policies that direct how particular suspicious connection requests should be handled.

Each of the number of servers 324 can include a number of agents. As used herein, an agent refers to a component of a server that relays messages between the cloud controller 302 and the server and performs a specific network service. For example, each of the number of servers 324 can include an agent that performs the services of at least one of an IP address agent, a switching agent, and/or a routing agent. Multiple instances of these agents could be running on each server, however, each agent can be connected to only one cloud controller 302.

Also, as illustrated in FIG. 3, the environment 320 can include an outside network 329. The outside network 329 can include a number of servers outside of (e.g., external to) the client-server network 330. For instance, the outside network 329 can include a plurality of private, public, academic, business and/or government networks, each including a plurality of computing devices and/or servers. For instance, the outside network 329 can refer to the Internet. As discussed further herein, servers 324 within the client-server network 330 can request access to servers in the outside network 329.

Figure 4:
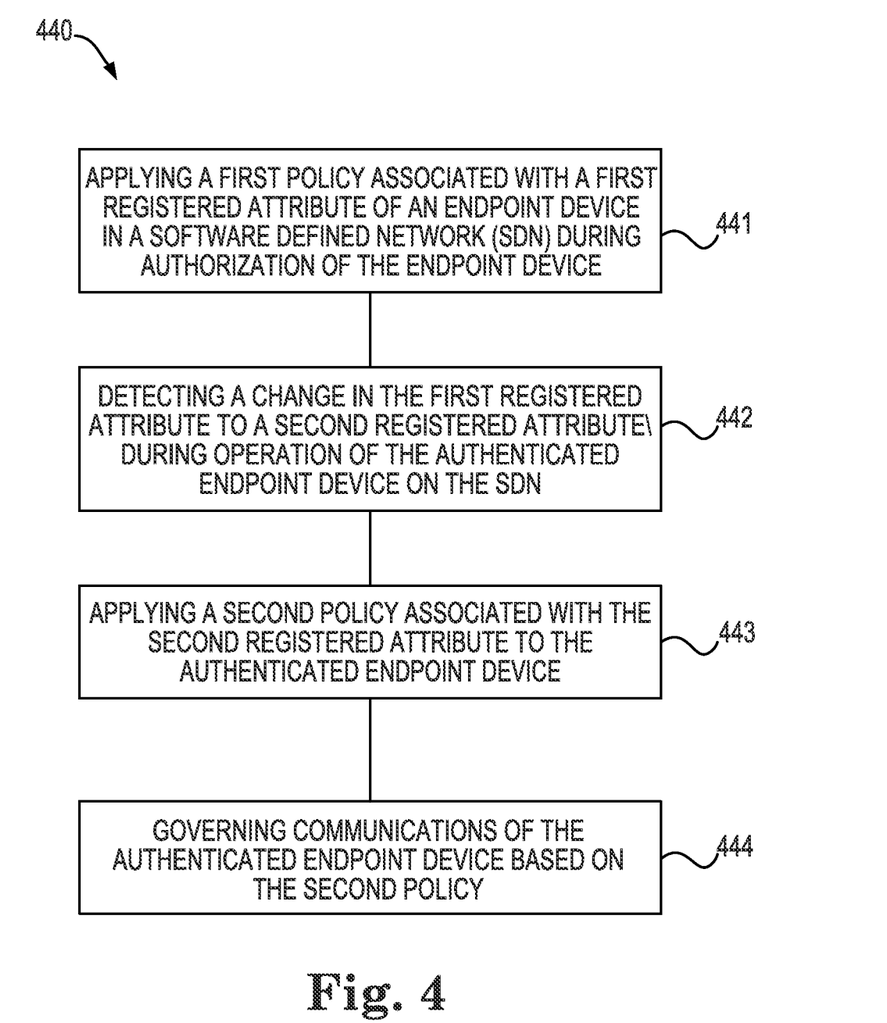
FIG. 4 illustrates a flow chart of a method according to the disclosure.

FIG. 4 illustrates a flow diagram of an example of a method according to the present disclosure. As shown at 441, in various examples, the method 440 can include, applying a first policy associated with a first registered attribute of an endpoint device in a SDN during authorization of the endpoint device. Applying refers to executing instructions to cause a policy (e.g., an existing policy of a plurality of existing policies stored in a database) to be applied to an endpoint device (e.g., an authenticated endpoint device).

The method 440 can include detecting a change in a first registered attribute to a second registered attribute during operation of the authenticated endpoint device on the SDN, as shown at 442. The method 440 can include applying a second policy associated with the second registered attribute to the authenticated endpoint device, as shown at 443. For instance, the second policy can be applied in response to detecting the change, as described herein.

As shown at 444, the method 440 can include governing communications of the authorized endpoint device based on the second policy, as described herein. In some examples, the method 440 can include providing a notification in response to detecting the change such as a change detected at 442. For example, an electronic communication such as an email, a pop up window, characters including graphical representation of the same, among other suitable types of notification can be provided to a database and/or a network administrator, among other possibilities.

Figure 5:
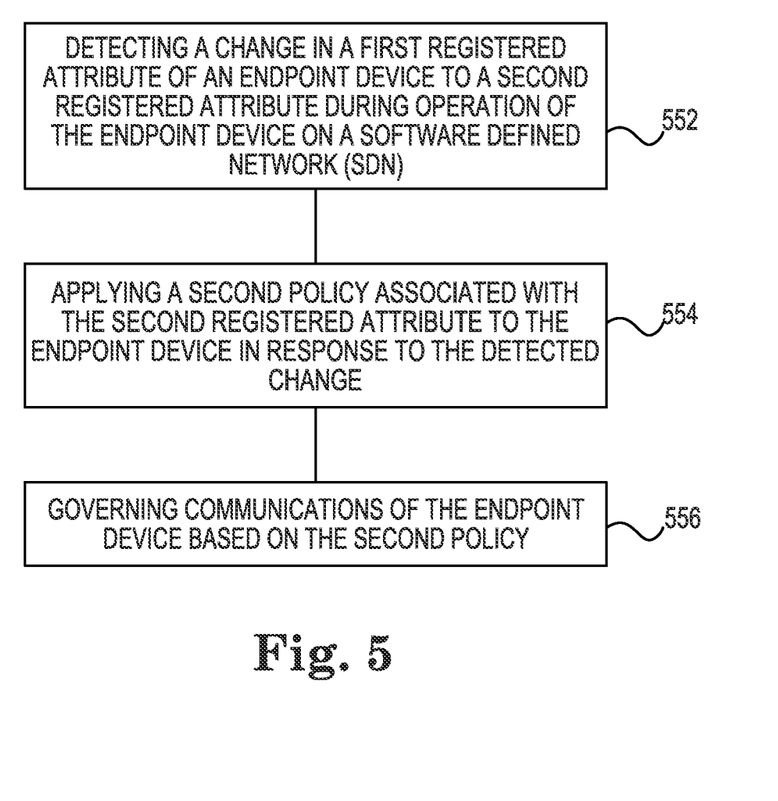
FIG. 5 illustrates a flow chart of a method according to the disclosure.

FIG. 5 illustrates a flow chart of a method according to the disclosure. The method 550 can include detecting a change in a first registered attribute of an endpoint device to a second registered attribute during operation of the endpoint device on a SDN, as shown at 552. In some examples, the method 550 can include detecting a change in a status attribute during operation of the endpoint device on the SDN, as described herein. For instance, in some examples, the method 550 can include detecting the change in the status attribute by an application, as described herein, during the operation of the endpoint device on the SDN.

The method 550 can include applying a second policy associated with the second registered attribute to the endpoint device in response to the detected change, as shown at 554. As shown at 556, the method 550 can include governing communications of the endpoint device based on the second policy, as described herein.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. For example, reference numeral 102 may refer to element "00" in FIG. 1 and an analogous element may be identified by reference numeral 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present.

As used herein, the term "and/or" includes any and all combinations of a number of the associated listed items. As used herein the term "or," unless otherwise noted, means logically inclusive or. That is, "A or B" can include (A), (B), or (both A and B). In other words, "A or B" can mean "A and/or B" or "one or more of A and B."

What is claimed:

1. A system, comprising:
   a detection engine to detect a change in a first registered attribute associated with an endpoint device authenticated on a network to a second registered attribute;
   an apply engine to apply the first policy with the endpoint device during authorization of the endpoint device on the network;
   a policy engine to change a first policy applied to the authenticated endpoint device to a second policy associated with the second registered attribute in response to the detected change, wherein the apply engine applies the second policy to the endpoint device while maintaining the authorization of the device on the network; and
   a response engine to execute an action governed by the second policy in response to a communication of the registered endpoint device.

2. The system of claim 1, where the detection engine detects the change based on monitored operations of the authenticated endpoint device on the network.

3. The system of claim 1, where the apply engine applies the second policy with the authenticated endpoint device subsequent to the authorization of the endpoint device on the network.

4. The system of claim 1, where the second policy is represented by a full Boolean expression including the second registered attribute and a full Boolean operator.

5. The system of claim 1, where the network is a software-defined network (SDN).

6. The system of claim 1, wherein the apply engine applies the second policy to the endpoint device without a user input.

7. A non-transitory computer readable medium storing instructions executable by a processing resource to cause a computer to:
associate a first registered attribute with an endpoint device;
apply a first policy associated with the first registered attribute to the endpoint device;
authenticate the endpoint device on a software defined network (SDN);
detect a change in the first registered attribute to a second registered attribute during operation of the authenticated endpoint device on the SDN; and
apply automatically, without a user input, a second policy to the endpoint device based on the second registered attribute in response to the detected change.

8. The non-transitory computer readable medium of claim 7, including instructions to apply the first policy during authorization of the endpoint device on the network.

9. The non-transitory computer readable medium of claim 7, including instructions to continue operation of the authenticated endpoint device on the SDN in response to applying the second policy to the authenticated endpoint device.

10. The non-transitory computer readable medium of claim 7, wherein the instructions to apply a second policy to the endpoint device based on the second registered attribute in response to the detected change comprises instructions to change the first policy to the second policy while maintaining the authorization of the endpoint device on the SDN.

11. A method, comprising:
applying a first policy associated with a first registered attribute of an endpoint device in a software defined network (SDN) during authorization of the endpoint device;
detecting a change in the first registered attribute to a second registered attribute during operation of the authenticated endpoint device on the SDN;
changing the first policy on the authenticated endpoint device to a second policy associated with the second registered attribute, wherein the first policy is changed to the second policy while maintaining the authorization of the endpoint device on the SDN; and
governing communications of the authenticated endpoint device based on the second policy.

12. The method of claim 11, including changing the first registered attribute to the second registered attribute in response to a suspicious connection request within the network.

13. The method of claim 11, where the second registered attribute is associated with the endpoint device by a SDN controller automatically.

14. The method of claim 11, including providing a notification in response to detecting the change.

15. A method, comprising:
detecting a change in a first registered attribute of an endpoint device to a second registered attribute during operation of the endpoint device on a software defined network (SDN);
applying, without a user input, a second policy associated with the second registered attribute to the endpoint device in response to the detected change; and
governing communications of the endpoint device based on the second policy.

16. The method of claim 15, wherein the first registered attribute is a status attribute, and including detecting a change in the status attribute during the operation of the endpoint device on the SDN.

17. The method of claim 16, including detecting the change in the status attribute by an application during the operation of the endpoint device on the SDN.

* * * * *

UNITED STATES PATENT AND TRADEMARK OFFICE
CERTIFICATE OF CORRECTION

PATENT NO. : 9,923,924 B2
APPLICATION NO. : 14/613843
DATED : March 20, 2018
INVENTOR(S) : Charles F. Clark and Duane E. Mentze Page 1 of 1

It is certified that error appears in the above-identified patent and that said Letters Patent is hereby corrected as shown below:

In the Claims

Claim 1:
Column 10, Line 48 should read "an apply engine to apply a first policy with the endpoint"
Column 10, Line 51 should read "a policy engine to change the first policy applied to the"

Signed and Sealed this
Ninth Day of June, 2020

Andrei Iancu
*Director of the United States Patent and Trademark Office*